United States Patent
Hartl et al.

[11] Patent Number: 5,430,818
[45] Date of Patent: Jul. 4, 1995

[54] PROTECTIVE CLADDING FOR A MONO-MODE DIRECTIONAL COUPLER

[75] Inventors: Engelbert Hartl; Gert Trommer, both of Munich; Hans Poisel, Leiuberg, all of Germany

[73] Assignee: Deutsche Aerospace AG, Munich, Germany

[21] Appl. No.: 179,680

[22] Filed: Jan. 11, 1994

[30] Foreign Application Priority Data

Jan. 13, 1993 [DE] Germany ............... 43 00 593.4

[51] Int. Cl.⁶ .................................. G02B 6/36
[52] U.S. Cl. .......................... 385/51; 385/42; 385/99
[58] Field of Search ............ 385/39, 42, 43, 51, 385/95–99

[56] References Cited

U.S. PATENT DOCUMENTS

| | | | |
|---|---|---|---|
| 4,714,316 | 12/1987 | Moore et al. | 385/99 X |
| 4,822,128 | 4/1989 | Imoto et al. | 385/43 |
| 5,148,508 | 9/1992 | Anjan et al. | 385/51 |
| 5,261,018 | 11/1993 | Suganuma et al. | 385/51 |
| 5,295,205 | 3/1994 | Miller et al. | 385/43 X |
| 5,295,219 | 3/1994 | Koya et al. | 385/96 X |

FOREIGN PATENT DOCUMENTS

| | | |
|---|---|---|
| 0357429 | 3/1990 | European Pat. Off. |
| 0507243 | 10/1992 | European Pat. Off. |
| 0525743 | 2/1993 | European Pat. Off. |
| 0541079 | 5/1993 | European Pat. Off. |
| 3919263 | 12/1990 | Germany |
| 1-118809 | 5/1989 | Japan ............... 385/99 |
| 1214806 | 8/1989 | Japan |
| 1295211 | 11/1989 | Japan |

*Primary Examiner*—John D. Lee
*Attorney, Agent, or Firm*—Evenson, McKeown, Edwards & Lenahan

[57] ABSTRACT

The protective cladding for a mono-mode directional coupler made of at least two incoming and outgoing fiber optic waveguides which are fused to one another along a coupling segment comprises at least two open cladding parts which can be connected to form a tube-shaped cladding. The material of the cladding parts has the same coefficient of expansion as the waveguide material of the mono-mode directional coupler. The protective cladding, being mechanically tightly connected with the incoming and outgoing fiber optic waveguides while leaving open the coupling segment of the mono-mode directional coupler, is closed off in a gas-tight manner such that in the case of temperature changes, there are no mechanical tensions in the coupling segment.

19 Claims, 1 Drawing Sheet

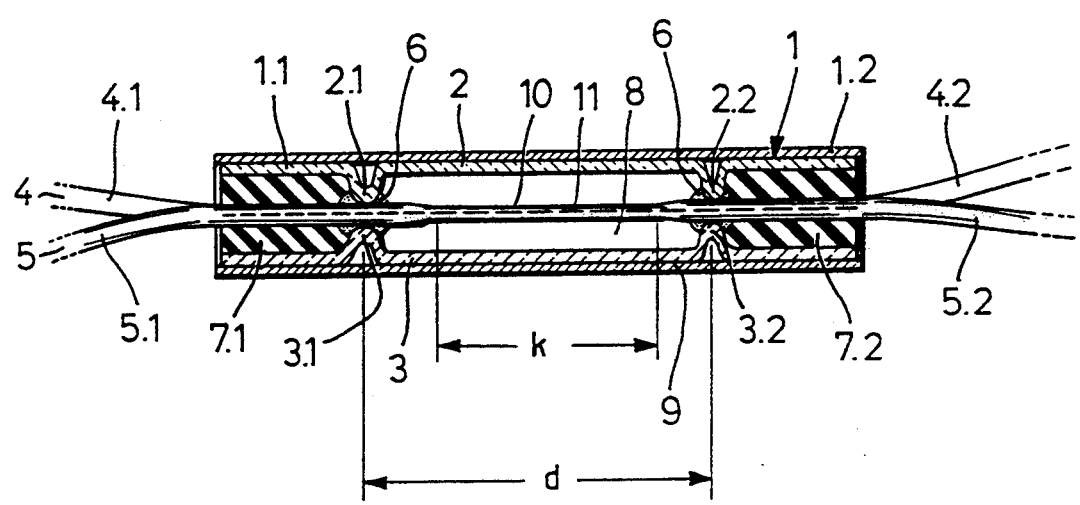

PROTECTIVE CLADDING FOR A MONO-MODE DIRECTIONAL COUPLER

This invention relates to a protective cladding or covering for a mono-mode directional coupler comprising at least two incoming and outgoing fiber optic waveguides which are fused to one another along a coupling segment.

Protective claddings for fiber optic couplers are well known, such as, for example, from German Patent document DE 39 19 263 A1, European Patent document EP 0 507 243 A1, and U.S. Pat. No. 4,822,128. These protective claddings have the purpose of mechanically reinforcing and therefore protecting from breakage the generally tapered coupling segment. When multimode fibers are used for so-called "star couplers", it is even possible to fuse the protective cladding directly to the coupler, such as in German Patent document DE 39 19 263 A1. For so-called directional couplers, which are made of mono-mode fibers, care must be taken, however, to avoid contact between the actual coupling segment and the protective cladding. Further, there also cannot be any other contamination from the air which deposits on the coupling segment because, apart from the phase shift of 90° between the incoming and the outgoing mode which is the result of the principle of operation, this would result in additional undefined phase shifts. For this reason, protective claddings are used for mono-mode directional couplers. The claddings essentially have the shape of a groove and are closed off either by means of a cover or by means of a second cladding, for example, European Patent document EP 507 243 A1, and are sealed on both sides.

However, on the bases of the mono-mode directional couplers with a protective cladding currently on the market, it was found that these directional couplers still react very sensitively to temperature changes with undefined phase shifts between the incoming and outgoing modes.

There is therefore needed a protective cladding for a mono-mode directional coupler which causes no phase shifts in the directional coupler during temperature fluctuations.

This need is met by a protective cladding for a mono-mode directional coupler comprising at least two incoming as well as outgoing fiber optic waveguides which are fused together along a coupling segment. At least two open cladding parts can be connected to form a cladding that is closed off in the shape of a tube. The material of the cladding parts has the same coefficient of expansion as the waveguide material of the mono-mode directional coupler. The cladding is mechanically firmly connected with the incoming and outgoing waveguides while keeping free the coupling segment. The coupling segment is closed off in a gas-tight manner by means of the cladding such that, in the case of temperature changes, no mechanical tensions occur in the coupling segment.

The present invention is based on the recognition that, because of their asymmetry, the previously known protective claddings bend slightly transversely with respect to the longitudinal direction during temperature changes. In this case, this bending has an effect on the coupling segment by way of the fiber optic waveguide ends which are mechanically firmly connected with the protective cladding. When different materials are used for the protective cladding, the fiber optic waveguides and the directional coupler, additional tensile or compressive strains may affect the coupling segment. These influences cause considerable phase shifts during the passage through the modes. The protective cladding provided according to the present invention eliminates this problem because of the fact that a homogeneous tube-shaped cladding is produced which surrounds the directional coupler in a uniform manner and in which the coupler can be placed beforehand in a tension-free fashion, and whose material has the same coefficient of expansion as the waveguide material of the optical fibers used for the coupler. Since, as a rule, mono-mode fiber optic waveguides consist of quartz fibers, quartz glass is therefore also suitable for the cladding.

It is particularly advantageous for the cladding to be as symmetrical as possible, and therefore to be constructed of cladding parts which are as symmetrical as possible. Groove-shaped cladding parts which have a semicircular, U-shaped, or V-shaped cross-section are particularly suitable for this purpose.

It is particularly advantageous for at least one cladding part to have two inwardly directed pedestals as the support for the incoming and outgoing fiber optic waveguides so that, if possible, the directional coupler can be situated in the axis of symmetry of the cladding. In this case, the pedestals have a mutual distance which is larger than the length of the coupling segment so that there is no contact with it.

Particularly when glass is used for the cladding parts, fusing of the cladding parts is suitable. The gas-tight closure may also advantageously take place by fusing-on the cladding in the area of the ends. In this case, the cladding will collapse on the ends of the fiber optic waveguides and, if necessary, while a glass solder is used, will in each case form a gas-tight closure on the ends. It is advantageous in this case for the closure, by collapsing the cladding, not to take place at the extreme end but rather at a certain distance in front of the extreme end so that the end will project beyond the closure as a protective collar for the fiber optic waveguides. An additional damping and sealing mass, such as silicon, may then be filled into this collar.

For increasing the resistance to breakage and impact forces, the protective cladding may be surrounded by a metal coating, for example, in the shape of a small metal tube into which the glass cladding is slid.

Other objects, advantages and novel features of the present invention will become apparent from the following detailed description of the invention when considered in conjunction with the accompanying drawings.

BRIEF DESCRIPTION OF THE DRAWING

The sole FIGURE is a sectional diagram of an embodiment according to the present invention.

DETAILED DESCRIPTION OF THE DRAWING

Referring to the FIGURE, a fusion coupler, which comprises two mono-mode fiber optic waveguides 4 and 5, and whose coupling segment 10 has a length k, is surrounded by a cladding 1. The cladding 1 comprises two identical groove-shaped cladding parts 2 and 3. The cladding parts 2 and 3 are made of the same material as the waveguide portion of the fibers 4 and 5, thus, for example, of quartz glass. The two cladding parts 2 and 3 each have inwardly directed pedestals 2.1 and 2.2 as well as 3.1 and 3.2, whose mutual distance d is larger than the length k of the coupling segment 10. Before the cladding parts 2 and 3 are fitted together, the directional coupler is placed in one cladding part (such as 3) on the pedestals (such as 3.1, 3.2) in such a manner that the coupling segment 10 does not come in contact with the pedestals. The height of the pedestals 2.1, 2.2, 3.1, 3.2 is dimensioned such that, when the two cladding parts 2 and 3 are fitted together to form a tube-shaped cladding 1, sufficient space remains between two mutually opposite pedestals 2.1 and 3.1, as well as 2.2 and 3.2, respectively for the incoming and outgoing fiber optic waveguides 4.1 and 5.1, as well as 4.2 and 5.2. In this case, a glass solder is also entered in these areas.

Thereafter, the two cladding parts 2 and 3 are fused together with one another along the mutually contacting lateral edges and then the glass solder 6 in the area between the pedestals 2.1 and 3.1 as well as 2.2 and 3.2 is caused to melt by being heated. In this case, it is advantageous for the cladding 1 to have a collar 1.1 and 1.2 on both ends. The collar projects beyond the pedestals 2.1, 2.2 as well as 3.1, 3.2. The collars protect the fiber optic waveguides during the heating phase. The actual coupling segment 10 of the directional coupler is therefore closed off in the cladding in an airtight manner. In this case, the closed-off space 8 may previously be filled with an inert gas. Subsequently, the interior spaces of the collars 1.1 and 1.2 are plugged by means of a viscous mass which forms one stopper 7.1 and 7.2 respectively, which surrounds the incoming and outgoing waveguide ends 4.1 and 5.1 as well as 4.2 and 5.2 and forms in each case a protection against bending.

For increasing the resistance to shock and breakage, the cladding 1 is pushed into a metal tube 9 and is slightly fixed in it.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A protective cladding for a mono-mode directional coupler including at least two incoming and outgoing fiber optic waveguides fused together along a coupling segment, comprising:
   at least two open cladding parts connectable to form a cladding, said cladding being closed-off in a tube shape, said cladding parts being made of a material having the same coefficient of expansion as the material of the mono-mode directional coupler,
   wherein said cladding is mechanically fixedly connected with said incoming and outgoing fiber optic waveguides while remaining mechanically fixedly free of said coupling segment so as to form a space therearound; and
   wherein said coupling segment is closed-off in a gas-tight manner by the cladding such that no mechanical tension occurs in the coupling segment due to temperature changes.

2. A protective cladding according to claim 1, wherein the cladding parts are constructed in the shape of half-shells.

3. A protective cladding according to claim 1, wherein the cladding parts have the same shape.

4. A protective cladding according to claim 3, wherein the cladding parts are fused together.

5. A protective cladding according to claim 1, wherein the cladding parts have one of a semicircular, U-shaped, and V-shaped cross-section.

6. A protective cladding according to claim 1, wherein the cladding parts are fused together.

7. A protective cladding according to claim 1, wherein a glass solder is arranged between the cladding and the incoming and outgoing fiber optic waveguides.

8. A protective cladding according to claim 1, wherein ends of the cladding are provided with elastic stoppers.

9. A protective cladding according to claim 1, wherein the cladding is surrounded by a metallic coating.

10. A protective cladding according to claim 1, wherein the coupling segment is arranged in the axis of symmetry of the cladding.

11. A protective cladding for a mono-mode directional coupler including at least two incoming and outgoing fiber optic waveguides fused together along a coupling segment, comprising:
    at least two open cladding parts connectable to form a cladding, said cladding being closed-off in a tube shape, said cladding parts being made of a material having the same coefficient of expansion as the material of the mono-mode directional coupler;
    wherein said cladding is mechanically fixedly connected with said incoming and outgoing fiber optic waveguides while remaining free of said coupling segment;
    wherein said coupling segment is closed-off in a gas-tight manner by the cladding such that no mechanical tension occurs in the coupling segment due to temperature changes; and
    wherein at least one of said cladding parts has two inwardly directed pedestals as a support for the incoming and outgoing fiber optic waveguides, with a mutual distance between pedestals which is larger than the length of the coupling segment.

12. A protective cladding according to claim 11, wherein the cladding is mechanically fixedly connected in the area of the pedestals with the fiber optic waveguides from which their coating is removed.

13. A protective cladding according to claim 11, wherein the cladding is collapsed at distances in front of its two ends by fusing upon the incoming and outgoing fiber optic waveguides such that the ends of the cladding remain essentially unchanged in their cross-section and each form a collar around the fiber optic waveguides.

14. A protective cladding according to claim 13, wherein a glass solder is arranged between the cladding and the incoming and outgoing fiber optic waveguides.

15. A protective cladding according to claim 14, wherein the coupling segment is arranged in the axis of symmetry of the cladding.

16. A protective cladding according to claim 11, wherein the cladding is surrounded by a metallic coating.

17. A protective cladding for a mono-mode directional coupler including at least two incoming and outgoing fiber optic waveguides fused together along a coupling segment, comprising:
    at least two open cladding parts connectable to form a cladding, said cladding being closed-off in a tube shape, said cladding parts being made of a material having the same coefficient of expansion as the material of the mono-mode directional coupler;
    wherein said cladding is mechanically fixedly connected with said incoming and outgoing fiber optic waveguides while remaining free of said coupling segment;

wherein said coupling segment is closed-off in a gas-tight manner by the cladding such that no mechanical tension occurs in the coupling segment due to temperature changes; and wherein the cladding is collapsed at distances in front of its two ends by fusing upon the incoming and outgoing fiber optic waveguides such that the ends of the cladding remain essentially unchanged in their cross-section and each form a collar around the fiber optic waveguides.

18. A protective cladding according to claim 17, wherein the cladding is surrounded by a metallic coating.

19. A protective cladding for a mono-mode directional coupler including at least two incoming and outgoing fiber optic waveguides fused together along a coupling segment, comprising:

at least two open cladding parts connectable to form a cladding, said cladding being closed-off in a tube shape, said cladding parts being made of a material having the same coefficient of expansion as the material of the mono-mode directional coupler;

wherein said cladding is mechanically fixedly connected with said incoming and outgoing fiber optic waveguides while remaining mechanically fixedly free of said coupling segment forming a space therearound;

wherein said coupling segment is closed-off in a gas-tight manner by the cladding such that no mechanical tension occurs in the coupling segment due to temperature changes;

wherein the cladding is collapsed at distances in front of its two ends by fusing upon the incoming and outgoing fiber optic waveguides; and wherein a glass solder is arranged between the cladding at its collapsed areas and the incoming and outgoing fiber optic waveguides.

* * * * *